Patented Dec. 7, 1926.

1,609,969

UNITED STATES PATENT OFFICE.

CARL ROBERT SCHROEDER, OF JERSEY CITY, NEW JERSEY, ASSIGNOR TO METAL & THERMIT CORPORATION, OF CHROME, NEW JERSEY, A CORPORATION OF NEW JERSEY.

METHOD OF MANUFACTURING FERROTUNGSTEN.

No Drawing.  Application filed October 31, 1923. Serial No. 671,840.

The instant invention relates to certain improvements in the method of producing ferro-tungsten containing up to 85% of tungsten, by reducing the ore, oxide or salts of the metals by the silico-thermic reaction, employing either pure silicon or ferro-silicon, in the presence of a suitable fluoride or other similar salt, in quantities sufficient to produce a highly fluid slag, without the addition of an oxidizing agent.

Ferro-tungsten has been produced heretofore by reducing tungsten ore or mixtures or compounds containing tungsten oxide and iron oxide, by three methods; first, by reduction with carbon in the electric furnace; second, by the alumino-thermic method; third, by the silico-thermic method. The present invention involves a material improvement in the last-mentioned or silico-thermic method. The silico-thermic method as heretofore practiced involves the reduction of tungsten ores with silicon, with the aid of an oxidizing agent such as sodium nitrate, so that sufficient heat will be liberated by the reduction of the latter to permit the principal reaction to proceed to completion, the prior practice also suggesting the advisability of the addition of 5% of a fluxing material such as calcium fluoride to render the resultant slag sufficiently fluid to separate from the metallic regulus.

The present invention is based upon the discovery, that, if tungsten ore or a mixture of tungsten oxide and iron oxide be mixed in the proper proportions with ground silicon or with ferro-silicon, and a predetermined larger percentage of flux, preferably calcium fluoride or calcium chloride, the reaction may be initiated at any point in the cold or in the heated mixture, by means of ignition powder as in the alumino-thermic process, and the reaction will proceed, upon feeding additional amounts of the mixture, to completion, thereby producing carbon-free ferro-tungsten. An alkali salt of the halogen group is an essential ingredient of the mixture, without which silicon will not react with cold tungsten ore, unless an oxidizing agent is admixed. In the reduction of tungsten ore, for instance, by means of silicon, the small amounts of calcium fluoride which were added to render the slag less viscous, were not sufficient to permit the oxidizing agent to be dispensed with, but as larger amounts of calcium fluoride are added, that is to say in excess of 5% of the ore, the ignition point of the mixture is progressively lowered, so that the relatively expensive oxidizing agent, together with corresponding amounts of reducing agent, may be entirely omitted and dispensed with, without decreasing the efficiency of the reduction of the ferro-tungsten and apparently rendering said reduction more complete in respect of quality and quantity of the desired product. Furthermore, since preheating always tends to accelerate the subsequent exothermic reaction, the preheating step may be applied whenever desired, in the practice of the instant invention, whereas when an oxidizing agent, such as sodium nitrate is present, preheating cannot be resorted to, because of the low melting point of the oxidizing agent. This possibility of preheating the mixture is very important, especially when it is necessary to reduce tungsten ores which contain relatively large proportions of inert matter, such as aluminum oxide, lime, silica, etc., for the reason that the silico-thermic reaction effected with the preheated materials enables a full and complete reduction yielding a relatively pure ferro-tungsten with the elimination of the inert materials, which are taken up in the slag.

The reason why calcium fluoride or an equivalent flux is effected in causing the reaction of the tungsten silico-thermic mixture to propagate at a lower temperature is problematical. The explanation may be that calcium fluoride is broken down at the high heat generated during the silico-thermic reduction of tungsten oxide, so that silicon fluoride is produced and the calcium is set free to reduce the tungsten oxide with a formation of calcium silicate. The heat of combustion of the nascent calcium would add heat to the reaction and the calcium silicate formed would lower the average fusing point of the slag, and, consequently, make the slag more thinly liquid, thereby resulting in a much more complete and effective separation of the slag from the molten metal. Heavy brown pungent fumes formed during the reduction, suggestive of silicon fluoride, tend to substantiate this theory. Regardless of the theory involved, the results obtained in actual practice prove that tungsten ore or oxides may be reduced, by the method indicated, when calcium fluoride or its equivalent is present, in the proportions hereinbefore indicated, without the help of any oxidizing agent such as sodium nitrate, calcium nitrate, sodium chlorate and the like.

Although, in the practice of the instant invention, the silico-thermic mixture may be directly reacted in a cold crucible, it has been found that if an initial and more or less indefinite amount of tungsten ore or other ferro-tungsten material be mixed with the proper proportions of pulverized aluminum and ignited to effect the alumino-thermic reaction, there will be formed, in the crucible, a hot liquid bath into which the cold mixture of tungsten ore, pulverized silicon or ferro-silicon and calcium fluoride may be fed directly. This mode of starting the silico-thermic reaction has the advantage of increasing the efficiency of the first part of said reaction, as outlined in my copending application, Serial No. 671,945, filed October 31, 1923.

The ferro-silicon used as a reducing agent, should be about 70% silicon, and, generally, the higher percentage the more effective the reaction. It has been found that ferro-silicon containing 85% silicon gives most excellent results. Crushed or ground commercial tungsten ores may be used, which may or may not require preliminary treatment for the elimination of objectionable elements, such as sulphur, tin, arsenic, bismuth and antimony by any of the well known methods. Manganese oxide in the ore is not objectionable, because it is not reduced by silicon and passes off with the slag.

The following example will illustrate a practical application of the invention:

A desulphurized tungsten ore, free of tin, containing 72% $WO_3$, 14% $FeO$, 10% $MnO$ and a ground ferro-silicon containing 85% silicon was used with commercial calcium fluoride (fluorspar) in the following proportions: 1000 lbs. tungsten ore, 188½ lbs. ferro-silicon, 75 lbs. calcium fluoride. The silicon in this mixture is only that necessary for the reduction of the ore. No reducing agent is required for the calcium fluoride. In this large experiment 140 lbs. of tungsten aluminum thermit were put in the crucible and reacted in the usual manner. After the reaction of the aluminothermic mixture was complete, the above silico-thermic mixture was fed into the molten bath as rapidly as possible, the entire amount reacted in six minutes and yielded a large regulus of ferro-tungsten. No metal remained in the slag, showing that the slag was perfectly liquid. The slag when cold is very glassy and breaks away from the metal regulus very readily. The efficiency of this reaction is consistently above 93% and the silicon content of the carbon free ferro-tungsten about .5%.

What I claim is:

1. The method of manufacturing ferro-tungsten, which comprises effecting silico-thermic reduction of iron-tungsten compounds in the presence of an excess of an alkali halide flux capable of producing a highly fluid slag without the addition of an oxidizing agent.

2. The method of manufacturing ferro-tungsten, which comprises effecting silico-thermic reduction of iron-tungsten compounds in the presence of an excess of a calcium halide flux without the addition of an oxidizing agent.

3. The method of manufacturing ferro-tungsten, which comprises effecting silico-thermic reduction of iron-tungsten compounds in the presence of an excess of calcium fluoride without the addition of an oxidizing agent.

4. The method of manufacturing ferro-tungsten, which comprises preheating the materials to be reduced and effecting silico-thermic reduction of the iron-tungsten material in the presence of a calcium halide flux without the addition of an oxidizing agent.

5. The method of manufacturing ferro-tungsten, which comprises preheating the materials to be reduced and effecting silico-thermic reduction of the iron-tungsten material in the presence of a calcium fluoride without the addition of an oxidizing agent.

In testimony whereof I affix my signature.

CARL ROBERT SCHROEDER.